Figure 1:
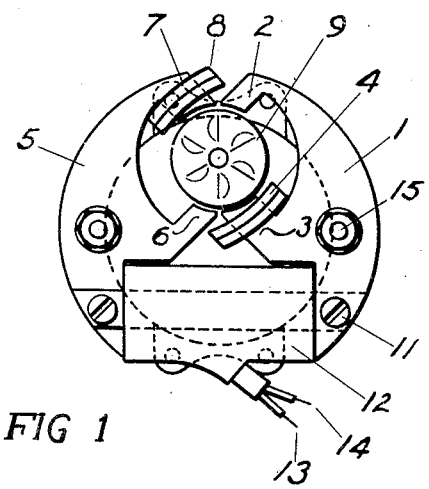

Aug. 23, 1938.     W. L. HANSEN ET AL     2,128,142
ROTOR
Filed May 22, 1936

INVENTOR
WILLIAM L. HANSEN
IRA N. HURST
BY
Toulmin & Toulmin
ATTORNEY

Patented Aug. 23, 1938

2,128,142

UNITED STATES PATENT OFFICE 2,128,142

ROTOR

William L. Hansen and Ira N. Hurst, Princeton, Ind., assignors to Hansen Mfg. Company, Inc., Princeton, Ind., a corporation of Indiana Application May 22, 1936, Serial No. 81,159

4 Claims. (Cl. 172—278)

Our invention relates to synchronous electric motors and in particular to sub-synchronous motors.

It is the object of our invention to provide a sub-synchronous motor, preferably of bipolar construction adapted to operate at speeds less than the synchronous motor speed of 3600 R. P. M.

It is a further object to provide a self-starting motor which will travel at speeds less than 3600 R. P. M., such as a speed of 1200 R. P. M. for instance.

It is our object to provide a balance of power in a shaded pole construction as compared to that of an unshaded pole and to secure such a result by increasing the size of the shaded pole until the shaded pole balances with the unshaded pole.

In particular it is an object to provide a rotor of a continuous disk form which has a plurality of poles. We provide an annealed carbon steel disk which is slit radially into a number of poles. The slitting is done diagonally across the disk, thus dividing it into symmetrical portions such as halves, quarters or sixths. The slits are the means of synchronizing. They do not cut the inner or outer rim of the disk. By leaving this inner and outer rim in a continuous body or circular portion, the self-starting is not affected. When this disk is slit and hardened, these slits offer resistance to the flow of magnetism except in the synchronizing portions of the rotor in the field.

Figure 4:
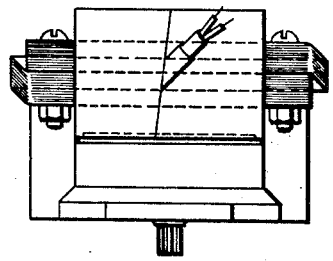
Figure 2:
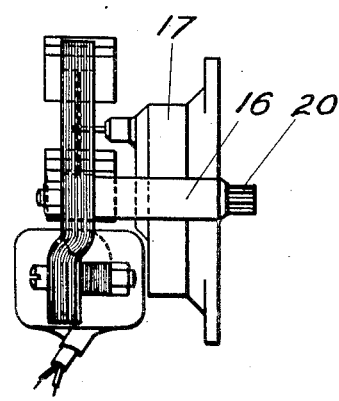
Figure 5:
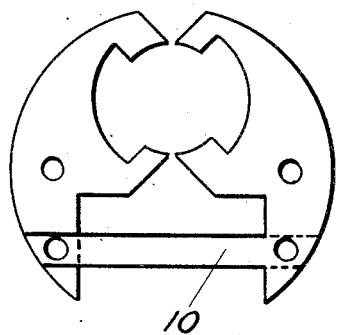
Figure 6:
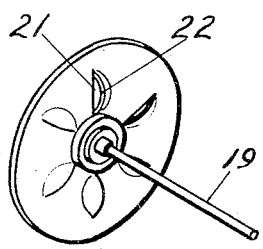
Figure 3:
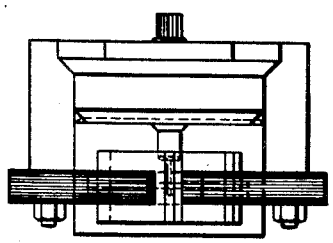
Figures 7, 8:
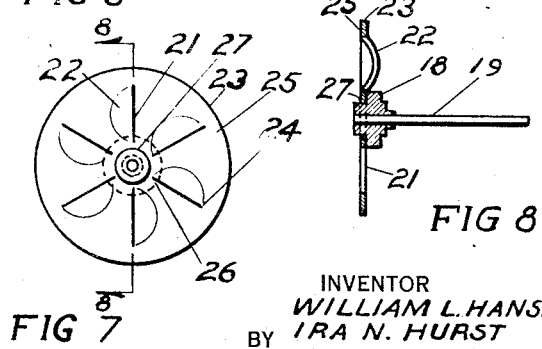

Referring to the drawing:

Figure 1 is a front elevation of the motor.
Figure 2 is a side elevation.
Figure 3 is a top plan view.
Figure 4 is a bottom plan view.
Figure 5 shows a pair of the magnet field plates of the stator in position.
Figure 6 is a perspective of the rear of the disk.
Figure 7 is a front elevation thereof.
Figure 8 is a section on the line 8—8 of Figure 7 looking in the direction of the arrows.

Referring to the drawing in detail, 1 designates one of the magnet field plates or stampings which has a relatively small pole 2 and a relatively large pole 3. The latter is provided with a shading coil 4. The opposite plate 5 has a small pole 6 adjacent the large pole 3. The plate 5 has a large pole 7 adjacent the small pole 2. The large pole 7 has a shading coil 8.

It will be observed that the large poles are about two-thirds larger than the small poles. Thus we are enabled to balance the power in the shaded pole to that of the unshaded pole. The interior of the faces of the poles are arcuate so as to be brought into close parallel relationship with the periphery of the rotor generally designated 9.

The field plates are provided with overlapping extensions 10 that are bolted to one another by the bolts 11. On these extensions there is mounted the field coil 12 having the current leads 13 and 14. The field plates are bolted by the bolts 15 into a sleeve 16 of the gear casing 17.

The rotor 9 is provided with a non-magnetic brass hub 18 for mounting the rotor 9 on the rotor shaft 19 which extends into the gear casing 17. It drives gears in the casing which in turn result in rotating the pinion 20.

Referring to the particular construction of the rotor which is one of the special features of this invention, it will be noted that a plurality of radial slits 21 are provided. Along the margin of these slits there are arcuate depressed or struck-up areas 22 forming semi-circular cup shaped depressions. The slits 21 do not extend to the periphery 23 of the disk but stop short of it as at 24. This leaves a continuous rim 25 of the annealed carbon steel disk. Likewise the inner ends of the slits terminate at 26 short of the hub 18, leaving an inner circle of continuous steel designated 27. The slits 21 are the means of synchronizing. By leaving the inner and outer rims 25 and 27, the self-starting of the rotor is not affected. When this disk is slit and hardened, the slits offer resistance to the flow of magnetism except in the synchronizing positions of the rotor in the field.

It will be understood that we desire to comprehend within our invention such modifications as may be necessary to adapt it to varying conditions and uses.

Having thus fully described our invention, what we claim as new and desire to secure by Letters Patent, is:

1. In a synchronous motor, field laminations having poles of different sizes, means on the larger poles for shading said poles, a field coil, and a rotor comprising a steel disk slit into a number of poles, said slits having a continuous steel portion on the inner and outer ends thereof in the disk, and radially directed projections adjacent said slits struck up from said disk.

2. A new article of manufacture for use in a synchronous electric motor comprising a rotor consisting of a hardened steel disk having radial slits, with an outer and inner continuous portion of the disk, and portions of the disk adjacent the slits being struck up therefrom to form radially directed projections.

3. In a synchronous electric motor, magnet plates having poles arranged in opposite adjacent pairs, shading means on one pole of each pair, said pole carrying the shading means being larger to the extent necessary to make the power thereof equal to the unshaded pole, a field coil, and a rotor comprising a hardened steel disk slit into a number of poles diametrically across the disk, said disk having struck-up radially directed portions adjacent said slits.

4. In a synchronous electric motor, magnet plates having poles arranged in opposite adjacent pairs, shading means on one pole of each pair, said pole carrying the shading means being larger to the extent necessary to make the power thereof equal to the unshaded pole, a field coil, and a rotor comprising a hardened steel disk slit into a number of poles diametrically across the disk, said disk having radially directed struck-up portions adjacent said slits, said radially directed struck-up portions having concave configurations of arcuate cross section.

WILLIAM L. HANSEN.
IRA N. HURST.